United States Patent
Filippi

(10) Patent No.: US 10,982,559 B2
(45) Date of Patent: Apr. 20, 2021

(54) SPLINE SEAL WITH COOLING FEATURES FOR TURBINE ENGINES

(71) Applicant: General Electric Company, Schenectady, NY (US)

(72) Inventor: Sergio Filippi, Montgomery, OH (US)

(73) Assignee: General Electric Company, Schenectady, NY (US)

( * ) Notice: Subject to any disclaimer, the term of this patent is extended or adjusted under 35 U.S.C. 154(b) by 133 days.

(21) Appl. No.: 16/111,783

(22) Filed: Aug. 24, 2018

(65) Prior Publication Data
US 2020/0063586 A1    Feb. 27, 2020

(51) Int. Cl.
| F01D 11/00 | (2006.01) |
| F01D 9/04 | (2006.01) |
| F01D 25/12 | (2006.01) |

(52) U.S. Cl.
CPC ............ *F01D 11/005* (2013.01); *F01D 9/047* (2013.01); *F01D 25/12* (2013.01); *F05D 2240/11* (2013.01); *F05D 2260/201* (2013.01)

(58) Field of Classification Search
CPC .... F01D 11/005; F01D 9/047; F05D 2240/11; F05D 2250/182; F05D 2240/55
See application file for complete search history.

(56) References Cited

U.S. PATENT DOCUMENTS

| 89,781 | A | * | 5/1869 | Martin | F16K 3/186 |
| | | | | | 251/195 |
| 4,679,981 | A | * | 7/1987 | Guibert | F01D 11/08 |
| | | | | | 415/116 |
| 5,188,506 | A | * | 2/1993 | Creevy | F01D 11/005 |
| | | | | | 277/643 |
| 5,460,489 | A | * | 10/1995 | Benjamin | F01D 11/008 |
| | | | | | 416/248 |
| 5,480,162 | A | * | 1/1996 | Beeman, Jr. | F01D 9/023 |
| | | | | | 277/355 |
| 5,513,955 | A | * | 5/1996 | Barcza | F01D 5/22 |
| | | | | | 416/193 A |
| 5,738,490 | A | * | 4/1998 | Pizzi | F01D 11/08 |
| | | | | | 415/139 |
| 6,059,525 | A | * | 5/2000 | Jiomacas | F01D 25/246 |
| | | | | | 415/139 |
| 6,340,285 | B1 | * | 1/2002 | Gonyou | F01D 11/005 |
| | | | | | 415/116 |
| 6,354,795 | B1 | * | 3/2002 | White | F01D 11/24 |
| | | | | | 415/116 |
| 6,726,448 | B2 | * | 4/2004 | McGrath | F01D 11/12 |
| | | | | | 415/173.3 |

(Continued)

*Primary Examiner* — Ninh H. Nguyen
*Assistant Examiner* — Brian Christopher Delrue
(74) *Attorney, Agent, or Firm* — Dority & Manning, P.A.

(57) ABSTRACT

A segmented flow path assembly and spline seals therefore are provided. A method for cooling a spline seal is also provided. In one exemplary aspect, a spline seal is provided that may be positioned at least in part in a groove defined by a first flowpath segment and at least in part in a oppositely facing groove defined by an adjacent flowpath segment. The spline seal may span the gap between the adjacent flowpath segments and provide sealing therefore. The spline seal includes features that allow a cooling flow to bypass the spline seal to cool the hot side of the seal as well as to meter the flow by the seal.

20 Claims, 9 Drawing Sheets

(56) References Cited

U.S. PATENT DOCUMENTS

| | | | | |
|---|---|---|---|---|
| 6,742,783 B1* | 6/2004 | Lawer | F01D 11/08 | 277/412 |
| 7,186,078 B2* | 3/2007 | Tanaka | F01D 5/225 | 415/170.1 |
| 7,217,081 B2* | 5/2007 | Scheurlen | F01D 11/008 | 415/1 |
| 7,347,662 B2* | 3/2008 | Balsdon | F01D 11/005 | 415/174.2 |
| 7,588,413 B2* | 9/2009 | Lee | F01D 5/186 | 415/115 |
| 8,100,644 B2* | 1/2012 | Hazevis | F01D 11/005 | 415/173.1 |
| 8,353,663 B2 | 1/2013 | Arzel et al. | | |
| 8,434,999 B2* | 5/2013 | Amaral | F01D 11/005 | 415/136 |
| 8,684,680 B2* | 4/2014 | Martin | F01D 11/08 | 415/173.1 |
| 8,753,073 B2* | 6/2014 | Albers | F01D 25/246 | 415/139 |
| 8,784,041 B2* | 7/2014 | Durocher | F01D 9/04 | 415/139 |
| 8,784,044 B2* | 7/2014 | Durocher | F01D 9/04 | 415/173.3 |
| 8,905,708 B2 | 12/2014 | Weber et al. | | |
| 8,961,117 B2* | 2/2015 | Garin | F01D 11/005 | 415/177 |
| 8,998,573 B2* | 4/2015 | Albers | F01D 11/005 | 415/173.3 |
| 9,238,977 B2* | 1/2016 | Albers | F01D 11/127 | |
| 9,810,086 B2 | 11/2017 | Correia et al. | | |
| 9,863,264 B2* | 1/2018 | Kulkarni | F01D 9/04 | |
| 9,874,104 B2 | 1/2018 | Shapiro | | |
| 2004/0017050 A1* | 1/2004 | Burdgick | F01D 11/005 | 277/637 |
| 2004/0141838 A1* | 7/2004 | Thompson | F01D 25/246 | 415/209.3 |
| 2005/0053462 A1* | 3/2005 | Burdgick | F01D 11/005 | 415/189 |
| 2005/0249588 A1* | 11/2005 | Ferra | F01D 9/042 | 415/170.1 |
| 2006/0182624 A1* | 8/2006 | London | F01D 5/225 | 415/170.1 |
| 2008/0128266 A1* | 6/2008 | Lee | F01D 5/186 | 204/164 |
| 2009/0074579 A1* | 3/2009 | Hervy | F01D 11/005 | 416/179 |
| 2009/0169368 A1* | 7/2009 | Schlichting | F01D 11/122 | 415/173.1 |
| 2010/0247298 A1* | 9/2010 | Nakamura | F01D 11/18 | 415/173.1 |
| 2011/0236183 A1* | 9/2011 | Amaral | F01D 11/005 | 415/134 |
| 2014/0348642 A1* | 11/2014 | Weber | F01D 11/005 | 415/170.1 |
| 2014/0363279 A1* | 12/2014 | Wondrasek | F01D 11/006 | 415/173.1 |
| 2015/0377063 A1 | 12/2015 | Scalzo et al. | | |
| 2017/0022831 A9 | 1/2017 | Durocher et al. | | |
| 2017/0130599 A1* | 5/2017 | Bunker | F01D 11/005 | |
| 2017/0284222 A1* | 10/2017 | Hafner | F01D 25/12 | |
| 2018/0038238 A1* | 2/2018 | Ribarov | F01D 11/20 | |
| 2018/0223681 A1* | 8/2018 | Gallier | F01D 25/12 | |
| 2018/0340437 A1* | 11/2018 | Groves, II | F01D 11/005 | |
| 2018/0355741 A1* | 12/2018 | Groves, II | F01D 11/005 | |
| 2018/0355753 A1* | 12/2018 | Groves, II | F01D 11/08 | |
| 2018/0355754 A1* | 12/2018 | Groves, II | F01D 11/005 | |
| 2018/0355755 A1* | 12/2018 | Groves, II | F01D 11/003 | |
| 2018/0372229 A1* | 12/2018 | Bidkar | F16J 15/442 | |
| 2020/0063578 A1* | 2/2020 | Notarnicola | F01D 25/246 | |

\* cited by examiner

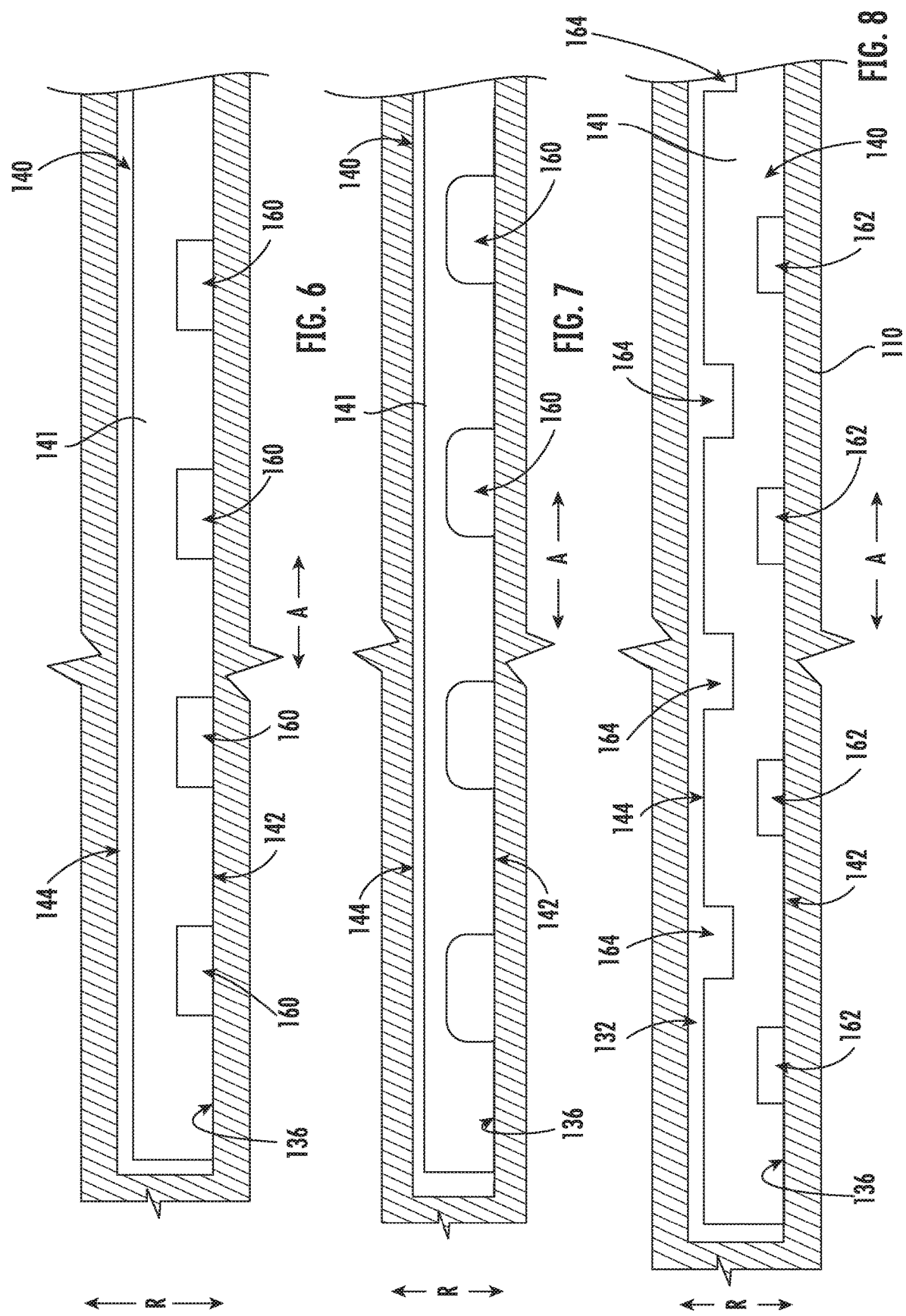

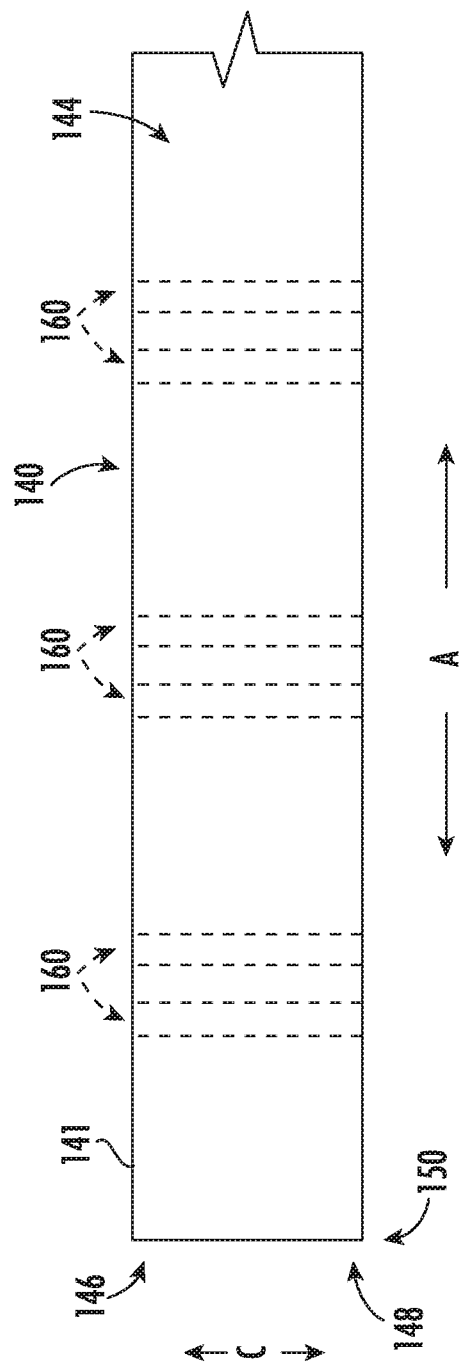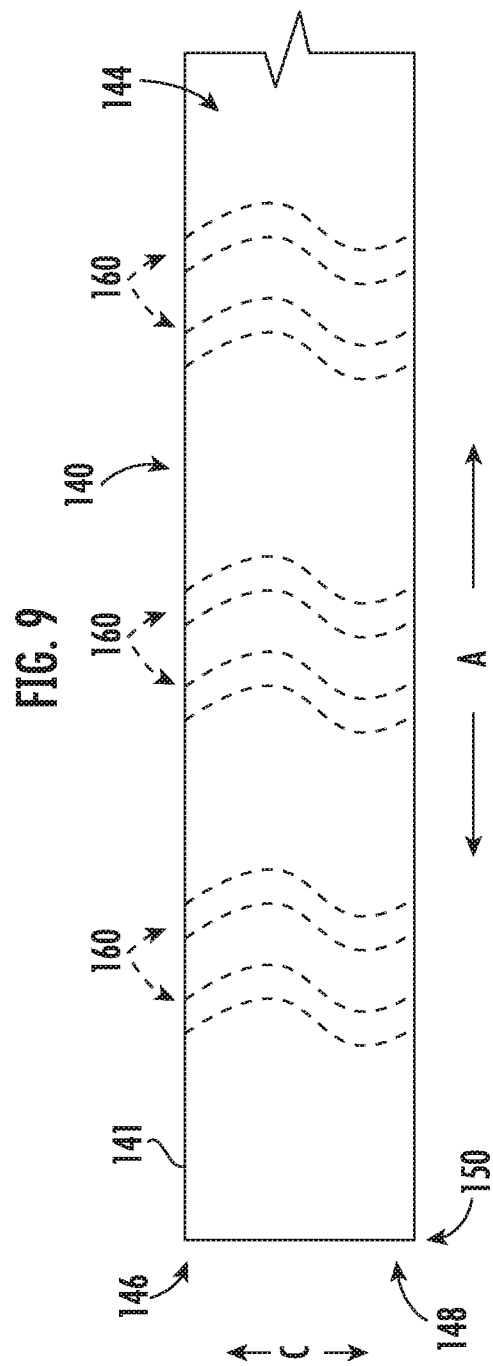

SPLINE SEAL WITH COOLING FEATURES FOR TURBINE ENGINES

FEDERALLY SPONSORED RESEARCH

This invention was made with government support under contract number FA8626-16-C-2138. The U.S. government may have certain rights in the invention.

FIELD

The present subject matter relates generally to spline seals for sealing adjacent flowpath segments of a turbomachine, such as e.g., shrouds of a turbine engine.

BACKGROUND

A gas turbine engine generally includes, in serial flow order, a compressor section, a combustion section, a turbine section and an exhaust section. In operation, air enters an inlet of the compressor section where one or more axial compressors progressively compress the air until it reaches the combustion section. Fuel is mixed with the compressed air and burned within the combustion section to provide combustion gases. The combustion gases are routed from the combustion section through a hot gas path defined within the turbine section and then are exhausted from the turbine section via the exhaust section.

Gas turbine engines typically include various segmented flowpath assemblies, such as nozzle and shroud assemblies. The nozzle and shroud assemblies typically include a plurality of circumferentially spaced segments with gaps extending between adjacent segments. The gaps accommodate thermal growth and reduce thermal stress in the flowpath segments. Such flowpath segments are more commonly being formed of ceramic matrix composite (CMC) materials and other high temperature materials that have higher temperature capabilities, e.g., compared to flowpath segments formed of more traditional materials. By forming flowpath segments with high temperature materials, the flowpath gas temperature may be increased and thus the engine may be operated more efficiently.

Spline seals are commonly used in gas turbine engines and are typically positioned within opposing grooves machined into the end faces of adjacent flowpath segments. Spline seals are typically made of high temperature alloys and thus have more limited high temperature capabilities, e.g., compared to the CMC flowpath segments. Therefore, spline seals may require a dedicated cooling flow. Conventional flowpath segments may include small cooling features, such as e.g., castellations, slits, or the like, machined into the end faces of adjacent flowpath segments to allow a cooling airflow to bypass the spline seal and meter the flow. The cooling airflow cools the spline seal from its cold side, then bypasses the spline seal and cools the seal along the hot side of the seal and mixes with the hot gas thereby lowering the temperature of the gas in proximity of the seal. The cooling airflow prevents oxidation, creep induced deformation, burning through, or other heat induced damage to the seal. The cooling slots or grooves must be machined with tight tolerances into the end faces of flowpath segments so that the amount of cooling airflow that bypasses the spline seal is controlled. Machining cooling features into flowpath segments is challenging, time consuming, and adds cost to the product. Moreover, if errors are made, the scrap cost is significant as flowpath segments are relatively expensive components to manufacture.

Accordingly, a segmented flowpath assembly and spline seal that address one or more of the challenges noted above would be useful.

BRIEF DESCRIPTION

Aspects and advantages of the invention will be set forth in part in the following description, or may be obvious from the description, or may be learned through practice of the invention.

In one exemplary embodiment of the present disclosure, a segmented flowpath assembly for a turbomachine is provided. The segmented flowpath assembly includes a first flowpath segment defining a first groove and a second flowpath segment positioned adjacent the first flowpath segment and defining a second groove oppositely facing the first groove of the first flowpath segment. The segmented flowpath assembly also includes a spline seal positioned at least partially within the first groove of the first flowpath segment and at least partially within the second groove of the second flowpath segment. The spline seal having a body extending between a first surface and a second surface opposing the first surface, wherein the body of the spline seal defines a plurality of channels along the first surface to allow airflow therethrough.

In some embodiments, the segmented flowpath assembly defines a radial direction, and wherein the body of the spline seal extends between the first surface and the second surface opposing the first surface along the radial direction, and wherein the first surface is an inner surface and the second surface is an outer surface of the body.

In some embodiments, the segmented flowpath assembly defines a circumferential direction, and wherein the body of the spline seal extends between a first side and a second side along the circumferential direction, and wherein the first side is positioned at least partially within the first groove of the first flowpath segment and the second side is positioned at least partially within the second groove of the second flowpath segment, and wherein the plurality of channels extend from the first side to the second side of the body.

In some embodiments, one or more of the plurality of channels extend between the first side and the second side along the circumferential direction in substantially a straight manner.

In some further embodiments, one or more of the plurality of channels extend between the first side and the second side along the circumferential direction in a non-straight manner.

In some embodiments, the segmented flowpath assembly defines an axial direction, and wherein the body of the spline seal extends between a first end and a second end along the axial direction, and wherein the plurality of channels are spaced from one another along the axial direction at predetermined intervals between the first end and the second end.

In some embodiments, the plurality of channels defined along the first surface of the body are a plurality of first channels, and wherein the body of the spline seal defines a plurality of second channels along the second surface.

In some further embodiments, the segmented flowpath assembly defines an axial direction, and wherein the plurality of second channels are spaced from one another along the axial direction and are offset from the plurality of first channels along the axial direction.

In some embodiments, a gap is defined between the first flowpath segment and the second flowpath segment, and wherein the first surface of the spline seal is seated on an inner wall of the first groove of the first flowpath segment and an inner wall of the second groove of the second flowpath segment during operation of the turbomachine.

In some embodiments, the spline seal is formed of a high temperature material.

In some embodiments, the first flowpath segment is a first shroud segment and the second flowpath segment is a second shroud segment.

In another exemplary embodiment of the present disclosure, a method for cooling a spline seal configured for sealing a gap defined between a first flowpath segment and a second flowpath segment of a segmented flowpath assembly for a turbomachine is provided. The method includes operating the turbomachine such that air flows from a high pressure region radially outward of the spline seal to a low pressure region radially inward of the spline seal, and wherein when air flows from the high pressure region to the low pressure region, the air flows through the gap between the first flowpath segment and the second flowpath segment and bypasses the spline seal through a plurality of channels defined at least in part by an inner surface of the spline seal.

In some implementations, during operating, the inner surface of the spline seal is seated on an inner wall that at least partially defines a first groove in the first flowpath segment and an inner wall that at least partially defines a second groove in the second flowpath segment during operation of the turbomachine.

In some implementations, the spline seal extends circumferentially between a first side and a second side and radially between the inner surface and an outer surface, and wherein the plurality of channels extend along the inner surface between the first side and the second side.

In some implementations, the first groove is defined by an inner wall, an outer wall spaced radially from the inner wall, and a sidewall extending between and connecting the inner wall and the outer wall, and wherein the second groove is defined by an inner wall, an outer wall spaced radially from the inner wall of the second groove, and a sidewall extending between and connecting the inner wall and the outer wall of the second groove, and wherein during operation of the turbomachine, a first portion of air flows between the outer wall of the first groove and the outer surface of the spline seal and into one of the plurality of channels at the first side of the spline seal and a second portion of air flows between the outer wall of the second groove and the outer surface of the spline seal and into one of the plurality of channels at the second side of the spline seal.

In yet another exemplary embodiment of the present disclosure, a spline seal for sealing a gap between adjacent flowpath segments of a turbomachine is provided. The spline seal includes a body extending between a first surface and a second surface spaced from the first surface, wherein the body of the spline seal defines one or more channels along the first surface.

In some embodiments, the body extends between a first side and a second side spaced from the first side, the first side and the second side extending between and connecting the first surface and the second surface, and wherein the one or more channels extend between the first side and the second side.

In some embodiments, the first side is positioned within a first groove defined by one of the adjacent flowpath segments and the second side is positioned with a second groove oppositely facing the first groove defined by the other one of the adjacent flowpath segments.

In some embodiments, the spline seal is formed of a high temperature material.

In some embodiments, the body of the spline seal defines one or more second channels along the second surface, and wherein the one or more second channels are offset from the one or more channels.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 6 provides a side view of one exemplary spline seal according to an exemplary embodiment of the present disclosure;

FIG. 7 provides a side view of another exemplary spline seal according to an exemplary embodiment of the present disclosure;

FIG. 8 provides a side view of yet another exemplary spline seal according to an exemplary embodiment of the present disclosure;

FIG. 9 provides a top view of one exemplary spline seal according to an exemplary embodiment of the present disclosure;

FIG. 10 provides a top view of another exemplary spline seal according to an exemplary embodiment of the present disclosure;

DETAILED DESCRIPTION

Figure 1:
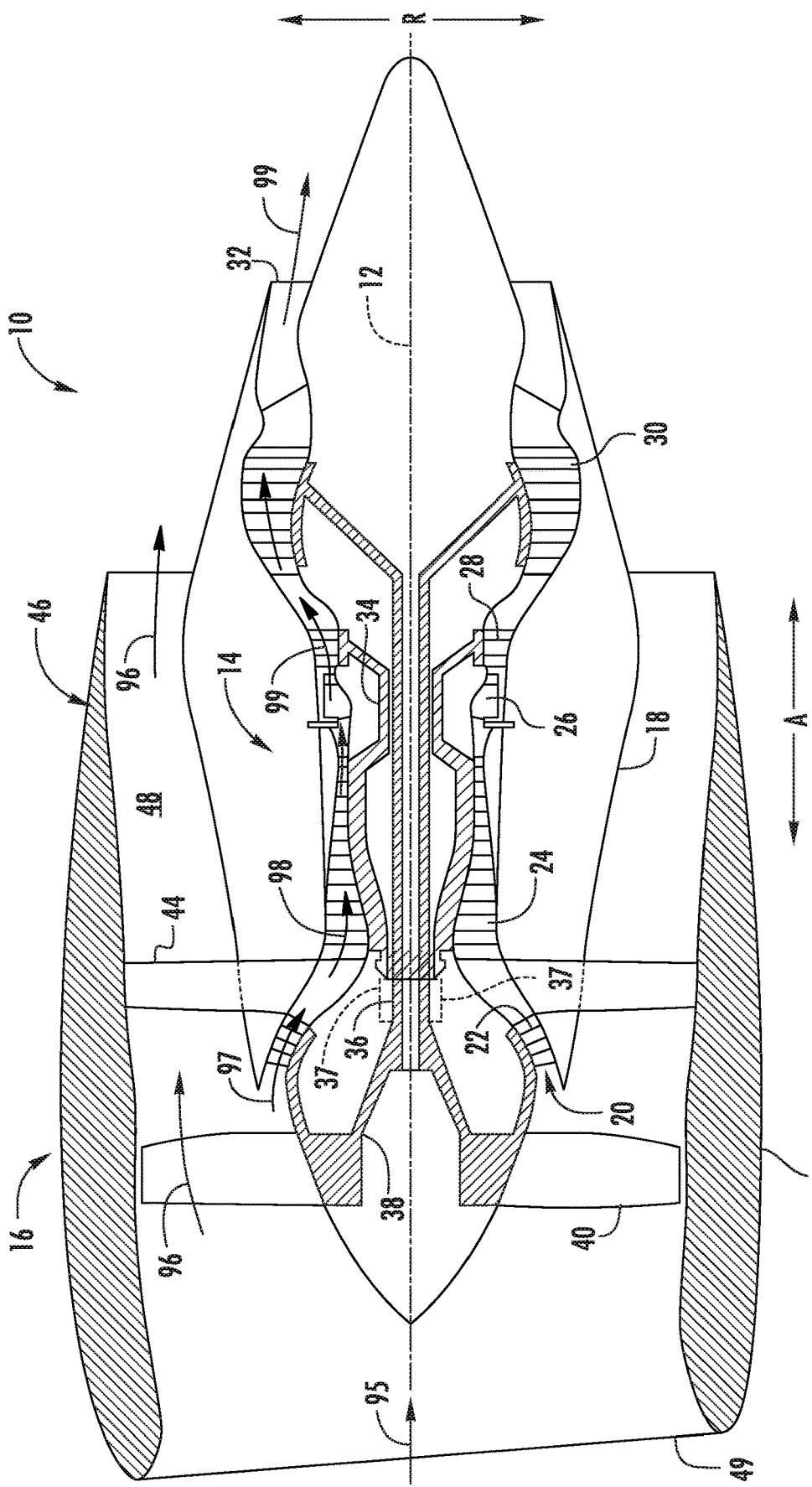
FIG. 1 provides a schematic cross-sectional view of a gas turbine engine in accordance with one embodiment of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. In addition, terms of approximation, such as "approximately," "substantially," or "about," refer to being within a ten percent (10%) margin of error. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows. Further, as used herein, the terms "axial" or "axially" refer to a dimension along a longitudinal axis of an engine. The term "forward" used in conjunction with "axial" or "axially" refers to a direction toward the engine inlet, or a component being relatively closer to the engine inlet as compared to another component. The term "aft" or "rear" used in conjunction with "axial" or "axially" refers to a direction toward the engine nozzle, or a component being relatively closer to the engine nozzle as compared to another component. The terms "radial" or "radially" refer to a dimension extending between a center longitudinal axis of the engine and an outer engine circumference.

The present disclosure is generally directed to a segmented flowpath assembly and spline seals therefore. For instance, the segmented flow path assembly may be a shroud assembly or nozzle assembly for a turbomachine. A method for cooling a spline seal is also provided. In one exemplary aspect, a spline seal is provided that may be positioned at least in part in a groove defined by a first flowpath segment and at least in part in an oppositely facing groove defined by an adjacent flowpath segment. The spline seal may span the gap between the adjacent flowpath segments and provide sealing therefore. The spline seal includes features that allow a cooling flow to bypass the spline seal to cool the spline seal, reduce the hot gas temperature on the hot side of the seal as well as to meter the cooling flow by the seal.

FIG. 1 provides a schematic cross-sectional view of an exemplary high-bypass turbofan type gas turbine engine 10 herein referred to as "turbofan 10" as may incorporate various embodiments of the present disclosure. As shown in FIG. 1, the turbofan 10 defines an axial direction A, a radial direction R, and a circumferential direction. Moreover, the turbofan 10 defines an axial centerline or longitudinal axis 12 that extends therethrough for reference purposes. In general, the axial direction A extends parallel to the longitudinal axis 12, the radial direction R extends orthogonally to or from the longitudinal axis 12, and the circumferential direction extends concentrically around the longitudinal axis 12.

The turbofan 10 includes a core turbine engine 14 disposed downstream from a fan section 16. The core turbine engine 14 may generally include a substantially tubular outer casing 18 that defines an annular core inlet 20. The outer casing 18 may be formed from multiple casings or a single casing. The outer casing 18 encases, in serial flow relationship, a compressor section having a booster or low pressure (LP) compressor 22, a high pressure (HP) compressor 24, a combustion section 26, a turbine section including a high pressure (HP) turbine 28, a low pressure (LP) turbine 30, and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The (LP) spool 36 may also be connected to a fan spool or shaft 38 of the fan section 16. In particular embodiments, the (LP) spool 36 may be connected directly to the fan spool 38 such as in a direct-drive configuration. In alternative configurations, the (LP) spool 36 may be connected to the fan spool 38 via a speed reduction device 37 such as a reduction gear gearbox in an indirect-drive or geared-drive configuration. Such speed reduction devices may be included between any suitable shafts/spools within the turbofan 10 as desired or required.

As further shown in FIG. 1, the fan section 16 includes a plurality of fan blades 40 that are coupled to and that extend radially outwardly from the fan spool 38. An annular fan casing or nacelle 42 circumferentially surrounds the fan section 16 and a portion of the core turbine engine 14. The nacelle 42 is supported relative to the core turbine engine 14 by a plurality of circumferentially-spaced outlet guide vanes 44. Moreover, a downstream section 46 of the nacelle 42 (downstream of the outlet guide vanes 44) may extend over an outer portion of the core turbine engine 14 so as to define a bypass airflow passage 48 therebetween.

During operation of the turbofan 10, an initial air flow (indicated by arrow 95) may enter the engine 10 through an associated inlet 49 of the nacelle 42. The air flow 95 then passes through the fan blades 40 and splits into a first compressed air flow (indicated by arrow 96) that moves through the bypass airflow passage 48 and a second compressed air flow (indicated by arrow 97) that enters the LP compressor 22 through core inlet 20. The pressure of the second compressed air flow 97 is then increased and enters the HP compressor 24 (as indicated by arrow 98). After mixing with fuel and being combusted within the combustor of the combustion section 26, the combustion products 99 exit the combustion section 26 and flow through the HP turbine 28. Thereafter, the combustion products 99 flow through the LP turbine 30 and exit the exhaust nozzle 32 to produce thrust for the turbofan 10. The compressed air 96 flowing through the bypass airflow passage 48 also produces thrust for the turbofan 10 as it exits the downstream section 46 of the nacelle 42.

Figure 2:
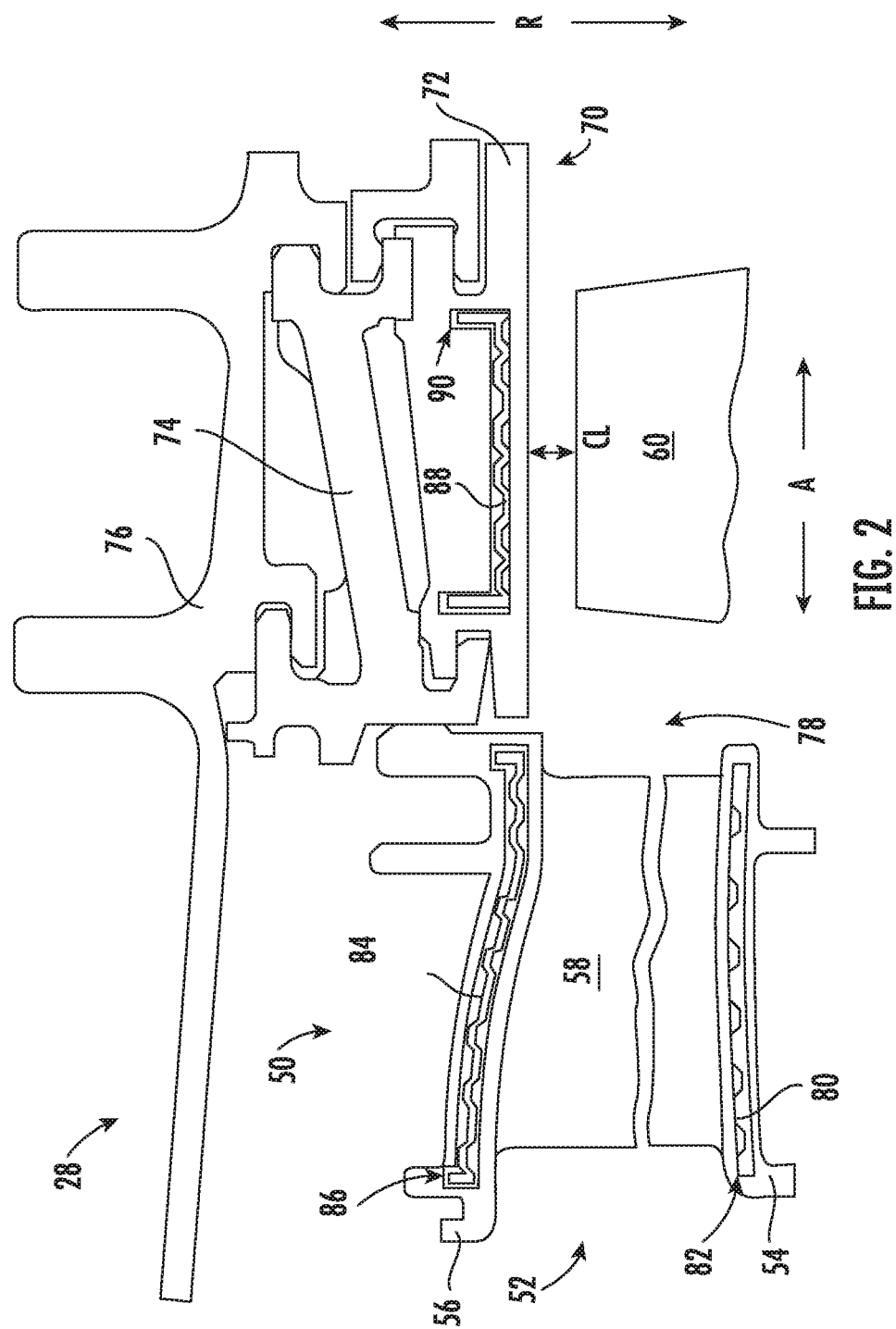
FIG. 2 provides a close up, cross sectional side view of a high pressure turbine portion of the gas turbine engine of FIG. 1.

FIG. 2 provides a close up, cross sectional view of the HP turbine 28 portion of the core turbine engine 14 of FIG. 1 as may incorporate various embodiments of the present disclosure. As shown in FIG. 2, the core turbine engine 14 of the turbofan 10 includes various segmented flowpath assemblies. For instance, one segmented flowpath assembly of the turbofan 10 is a nozzle assembly 50 that is formed of a plurality of circumferentially-spaced nozzle segments 52 (only one shown in FIG. 2). Each nozzle segment 52 includes an inner band 54 and an outer band 56 spaced from the inner band 54, e.g., along the radial direction R. Moreover, each nozzle segment 52 includes an airfoil or stator vane 58. The nozzle segments 52 collectively form an annular ring or nozzle assembly 50. The stator vanes 58 of each nozzle segment 52 are spaced from an annular array of turbine rotor blades 60 (only one shown), e.g., along the axial direction A. The turbine rotor blades 60 extend radially outward from and are coupled to the HP spool 34 (FIG. 1).

As further shown in FIG. 2, another segmented flowpath assembly of the turbofan 10 is a shroud or shroud assembly 70 that is formed of a plurality of circumferentially-spaced shroud segments 72 (only one shown in FIG. 2). The shroud assembly 70 forms an annular ring about the array of rotor blades 60. Each shroud segment 72 is carried by an arcuate shroud hanger 74, which is in turn mounted to an annular casing 76 (which may be connected to or formed as part of casing 18 of FIG. 1). Each shroud hanger 74 is mounted to the casing 76 by forward and aft hooks which engage mating mechanical features of the casing 76. In general, the shroud segments 72 of the shroud assembly 70 are radially spaced from the blade tips of the rotor blades 60. A radial or clearance gap CL is defined between the blade tips and the shroud segments 72.

The inner and outer bands 54, 56 and stator vanes 58 of the nozzle segments 52 and the shroud segments 72 and the turbine rotor blades 60 at least partially define a hot gas path 78 for routing combustion gases from the combustion section 26 (FIG. 1) through the HP turbine 28. The inner bands 54, outer bands 56, and shroud segments 72 generally reduce leakage of high pressure air into the lower pressure hot gas path 78. The segmented flowpath assemblies include spline seals disposed between adjacent flowpath segments for sealing adjacent segments, e.g., in the axial and radial directions A, R. For this embodiment, the inner band 54 defines a groove 82 in which a spline seal 80 is at least partially disposed. The spline seal 80 may be at least partially disposed within a groove defined by the inner band of an adjacent flowpath segment. The outer band 56 defines a groove 86 in which a spline seal 84 is at least partially disposed. The spline seal 84 may be at least partially disposed within a groove defined by the outer band of an adjacent flowpath segment. Moreover, the shroud segment 72 defines a groove 90 in which a spline seal 88 is at least partially disposed. The spline seal 88 may be at least partially disposed within a groove defined by an adjacent shroud segment. In accordance with exemplary aspects of the present disclosure, as will be explained further below, the spline seals 80, 84, and 88 may include cooling features that advantageously cool the spline seals, e.g., during operation of turbofan 10, and also meter the flow or leakage into the hot gas path 78.

It should be noted that the exemplary segmented flowpath assemblies disclosed herein not only apply to segmented flowpath assemblies positioned within the HP turbine 28 as shown in FIG. 2, but also apply to other segmented flowpath assemblies positioned elsewhere, such as, e.g., in a compressor section of turbofan 10. Further, although the segmented flowpath assemblies are described above in the context of a turbofan for an aircraft, the inventive aspects disclosed herein apply to other turbomachinery as well.

Figure 3:
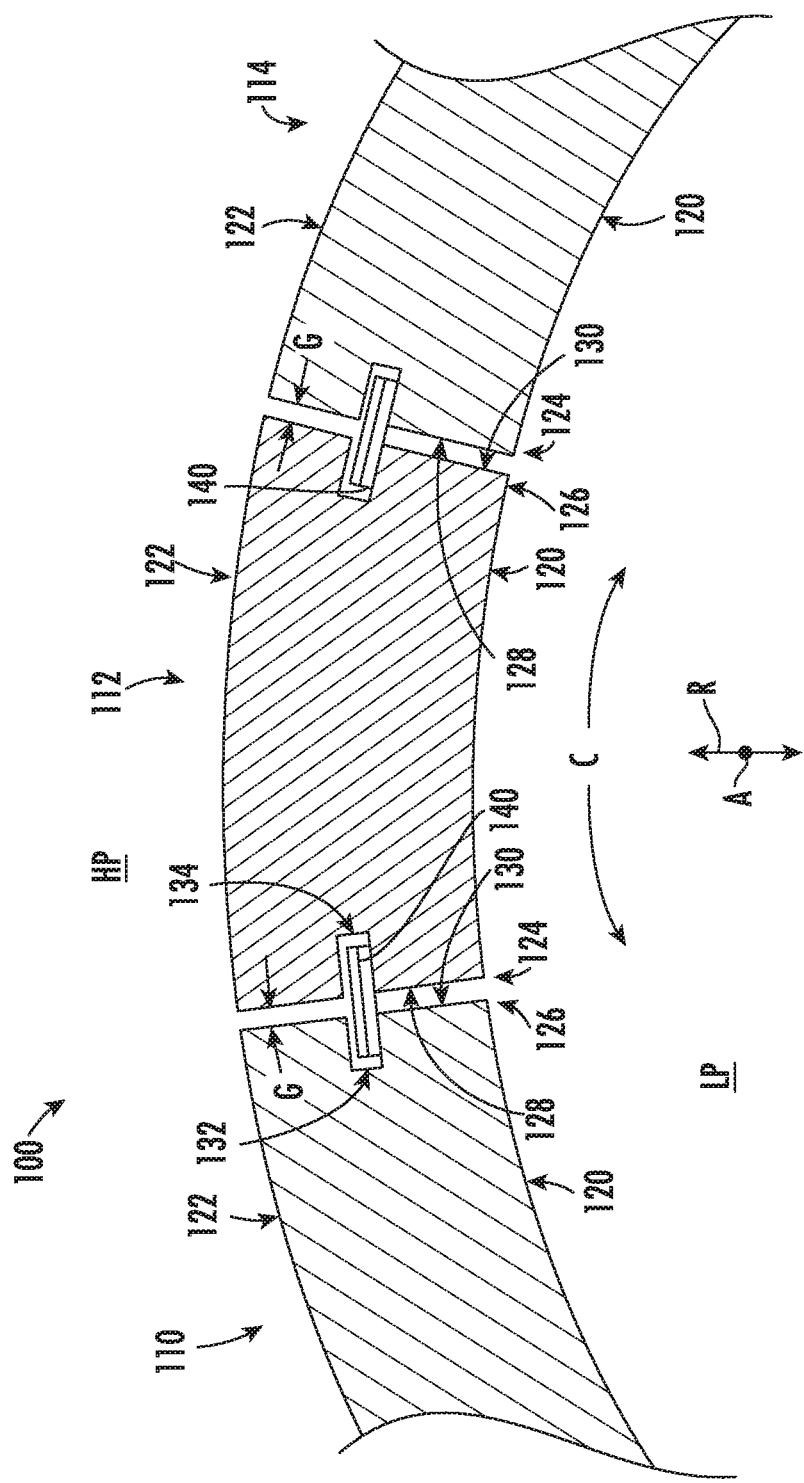
FIG. 3 provides a schematic, axial cross sectional view of a portion of an exemplary segmented flowpath assembly in accordance with exemplary embodiments of the present disclosure.

FIG. 3 provides a schematic, axial cross sectional view of a portion of an exemplary segmented flowpath assembly 100 in accordance with exemplary embodiments of the present disclosure. In some embodiments, the segmented flowpath assembly 100 depicted in FIG. 3 is a shroud or shroud assembly formed of a plurality of shroud segments, such as e.g., the shroud assembly 70 of FIG. 2. The shroud assembly may annularly surround turbine blades in a turbine engine, for example. In other embodiments, the segmented flowpath assembly 100 depicted in FIG. 3 is an annular array of inner or outer bands of nozzle segments of a nozzle assembly positioned within a turbine section, such as e.g., the nozzle assembly 50 of FIG. 2. In other embodiments, the segmented flowpath assembly 100 may be positioned with the compressor section of a turbine engine or other turbomachine. Although the segmented flowpath assembly 100 is described below as an application for gas turbine engines in the aviation industry, it should be appreciated that the segmented flowpath assembly 100 can be configured for use in any suitable application and in any suitable industry. For example, the segmented flowpath assembly 100 can be used in the automotive, maritime, power generation, and/or other suitable industries and may be used or incorporated into any suitable turbomachine.

As shown in FIG. 3, like the turbofan 10 of FIG. 1, the segmented flowpath assembly 100 defines an axial direction A, a radial direction R, and a circumferential direction C. Moreover, the segmented flowpath assembly 100 defines an axial centerline (not shown) that extends along the axial direction A. The segmented flowpath assembly 100 is concentrically aligned with the axial centerline. In general, the axial direction A extends parallel to the axial centerline, the radial direction R extends orthogonally to and from the axial centerline, and the circumferential direction C extends three hundred sixty degrees (360°) around the axial centerline.

The segmented flowpath assembly 100 includes a first flowpath segment 110, a second flowpath segment 112, and a third flowpath segment 114. The second flowpath segment 112 is positioned adjacent the first flowpath segment 110, e.g., along the circumferential direction C, and the third flowpath segment 114 is positioned adjacent the second flowpath segment 112, e.g., along the circumferential direction C. Although three (3) flowpath segments are shown in FIG. 3, any suitable number of flowpath segments may form the segmented flowpath assembly 100. As one example, the segmented flowpath assembly 100 may include a plurality of flowpath segments that form an annular ring. As another example, the segmented flowpath assembly 100 may include a plurality of flowpath segments that form a partial ring.

Figure 4:
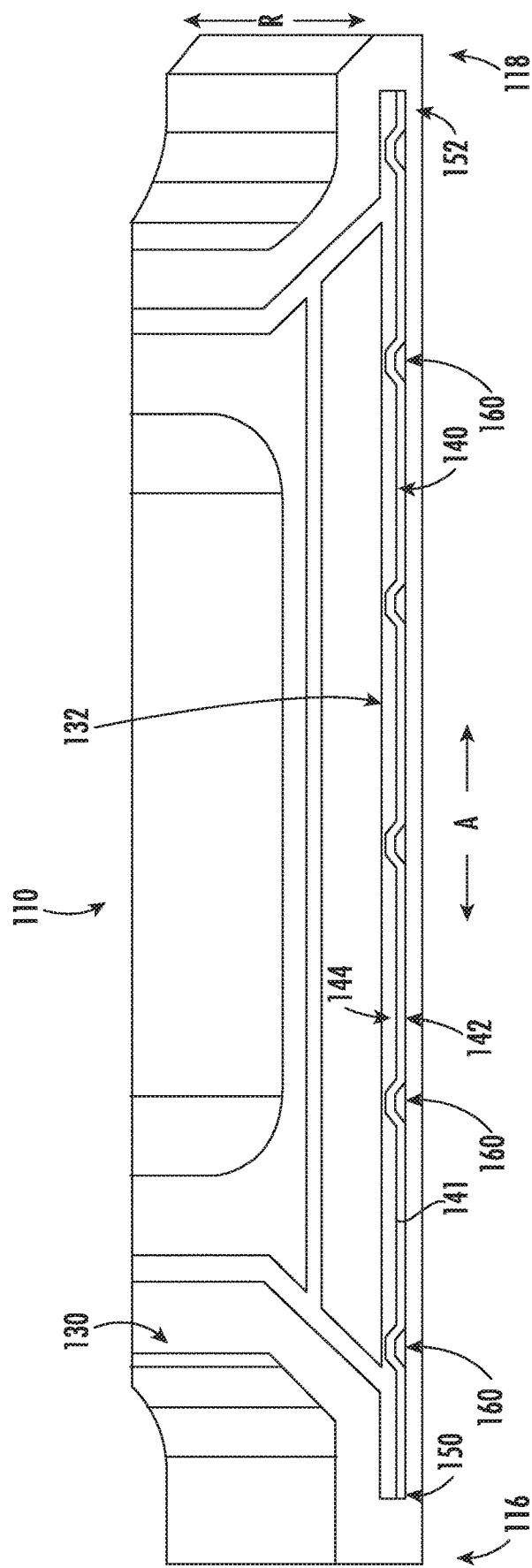
FIG. 4 provides a side view of a portion of a first flowpath segment of the segmented flowpath assembly of FIG. 3 and depicts a spline seal positioned within a first groove defined by the first flowpath segment.

Each flowpath segment 110, 112, 114 extends between a first end 116 and a second end 118, e.g., along the axial direction A (FIG. 4). For instance, the first end 116 may be a forward end and the second end 118 may be an aft end of a flowpath segment. Each flowpath segment 110, 112, 114 also extends between an inner side 120 and an outer side 122, e.g., along the radial direction R. For instance, the inner side 120 may be a hot side and the outer side 122 may be a cold side of a flowpath segment, e.g., where the segmented flowpath assembly 100 is positioned within a turbine section of a turbomachine. Further, each flowpath segment 110, 112, 114 extends between a first side 124 and a second side 126, e.g., along the circumferential direction C. Moreover, each flowpath segment 110, 112, 114 has a first end face 128 at their respective first sides 124 and a second end face 130 at their respective second sides 126. Generally, the first and second end faces 128, 130 of the flowpath segments extend in a radial plane. In some embodiments, the first and second end faces 128, 130 of the flowpath segments can be orthogonal to the circumferential direction C. In other embodiments, especially for nozzle bands, they are not in the direction normal to the circumferential direction C.

As further depicted in FIG. 3, the first flowpath segment 110 defines a first groove 132. Particularly, the first flowpath segment 110 defines the first groove 132 at its second end face 130. The second flowpath segment 112 positioned adjacent the first flowpath segment 110 defines a second groove 134 oppositely facing the first groove 132 of the first flowpath segment 110. More specifically, the second flowpath segment 112 defines the second groove 134 at its first end face 128. Further, the second flowpath segment 112 defines a groove at its second end face 130 and the third flowpath segment 114 defines a groove at its first end face 128 that oppositely faces the groove defined by the second flowpath segment 112 at its second end face 130.

Notably, a spline seal 140 is positioned at least partially within the first groove 132 of the first flowpath segment 110 and at least partially within the second groove 134 of the second flowpath segment 112. Similarly, a spline seal 140 is positioned at least partially within the groove defined at the second end face 130 of the second flowpath segment 112 and at least partially within the groove defined at the first end face 128 of the third flowpath segment 114. Spline seals may be positioned between other adjacent flowpath segments of the segmented flowpath assembly 100 in a like fashion, e.g., to form a partial or full annular ring. Generally, the spline seals 140 span a gap G defined between adjacent flowpath segments and prevent air from leaking along the radial direction R. For instance, if the segmented flowpath assembly 100 is positioned within a turbine section of a turbomachine, the spline seals 140 prevent air from leaking radially inward from a high pressure region HP to a low pressure region LP (e.g., the hot gas path 78 of FIG. 2). The spline seal can also prevent the hot gas from the flow path to leak radially outward to a local region of lower pressure within the nozzle band cavities or shroud cavities. If the segmented flowpath assembly 100 is positioned within a compressor section of a turbine engine, the spline seals 140 prevent air from leaking radially outward from a high pressure region HP or core airflow path to a low pressure region LP radially outward of the core airflow path. In some embodiments, the spline seals 140 are formed of a high temperature material, such as e.g., a high temperature alloy, a CMC material, or a hybrid material.

Figure 5:
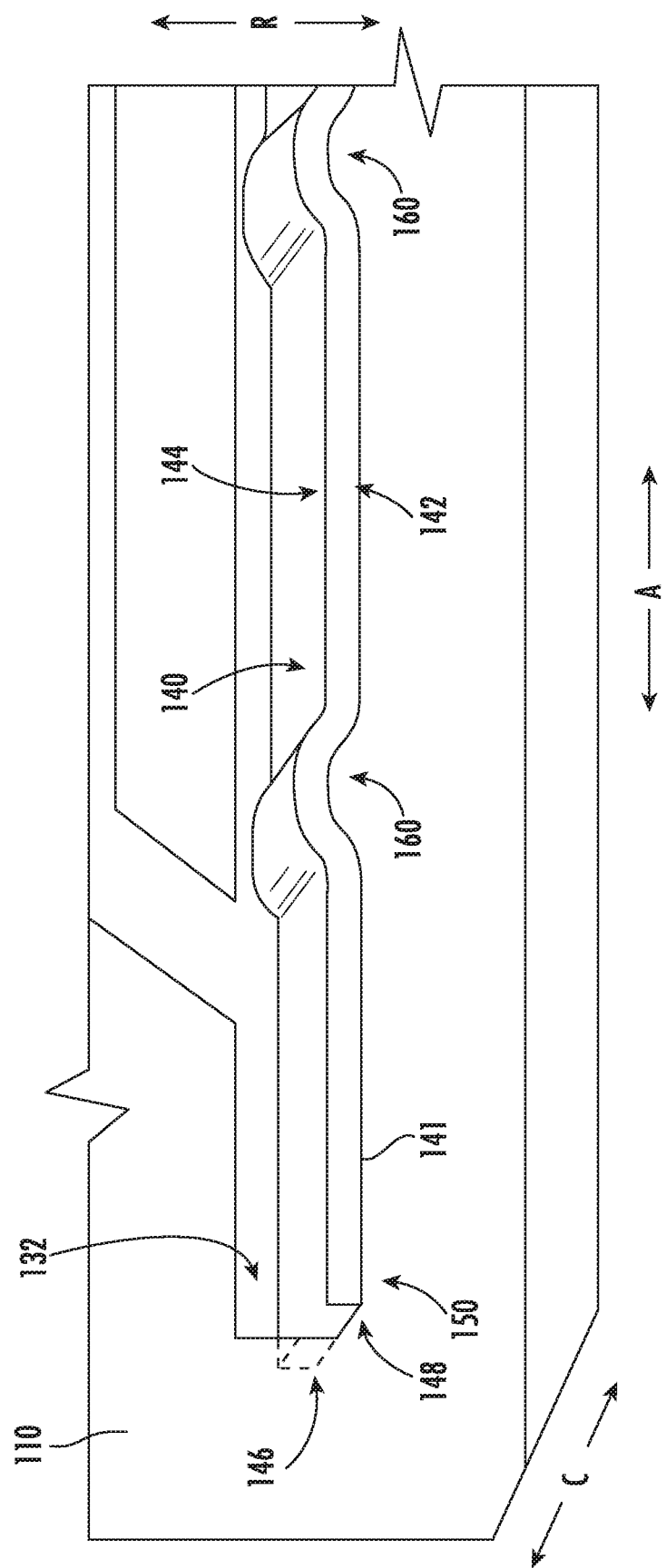
FIG. 5 provides a perspective view of the spline seal positioned at least partially in the first groove of the first flowpath segment of FIG. 4.

FIGS. 4 and 5 provide various views of an exemplary spline seal 140 positioned within the first groove 132 of the first flowpath segment 110 (second flowpath segment 112 has been removed for illustrative purposes). More particularly, FIG. 4 provides a side view of a portion of the first flowpath segment 110 with the spline seal 140 positioned at least partially within the first groove 132. FIG. 5 provides a perspective view of the spline seal 140 positioned at least partially within the first groove 132 of the first flowpath segment 110. As shown, the spline seal 140 has a body 141 that extends between a first surface 142 and a second surface 144 opposing the first surface 142, e.g., along the radial direction R. For this embodiment, the first surface 142 is an inner surface and the second surface 144 is an outer surface of the spline seal 140. In addition, the body 141 of the spline seal 140 extends between a first side 146 and a second side 148 (FIG. 5), e.g., along, mainly, the circumferential direction C. As shown best in FIG. 3, the first side 146 (not labeled in FIG. 3) of the spline seal 140 is positioned at least partially within the first groove 132 of the first flowpath segment 110 and the second side 148 (not labeled in FIG. 3) is positioned at least partially within the second groove 134 of the second flowpath segment 112. The spline seal 140 positioned between the second flowpath segment 112 and the third flowpath segment 114 is similarly positioned within the oppositely facing grooves. In addition, as best shown in FIG. 4, the body 141 of the spline seal 140 extends between a first end 150 and a second end 152, e.g., along the axial direction A.

As further shown in FIGS. 4 and 5, the spline seal 140 includes a plurality of cooling features. More particularly, the body 141 of the spline seal 140 defines a plurality of channels 160 to allow airflow therethrough. For this embodiment, the body 141 of the spline seal 140 defines the plurality of channels 160 along the first surface 142, which in this embodiment is the inner surface of the spline seal 140 as depicted. The plurality of channels 160 are spaced from one another along the axial direction A between the first end 150 and the second end 152 of the spline seal 140. The channels 160 may be spaced from one another along the axial direction A at predetermined intervals. For instance, in some embodiments, the channels 160 may be axially spaced from one another by a uniform distance (i.e., the channels 160 may be equally spaced from one another). Although six (6) channels 160 are depicted in FIG. 4, it will be appreciated that the spline seal 140 may define any suitable number of channels 160. In some embodiments, the body 141 of the spline seal 140 defines at least three (3) channels 160. In some embodiments, the body 141 may define a single channel 160. In some embodiments, the channels 160 are defined in pairs and the pairs are spaced from one another along the axial direction A. Generally, the number and position of the channels 160 may be determined by analyses and/or test experience to allow cooling in the areas of need and avoid leakage where cooling is not needed.

Moreover, as best shown in FIG. 5, the channels 160 defined by the body 141 of the spline seal 140 extend from the first side 146 to the second side 148 of the spline seal 140. That is, each channel 160 extends the full circumferential length of the spline seal 140. In alternative exemplary embodiments, the channels 160 need not extend the full circumferential length of the spline seal 140. For instance, in some embodiments, one or more channels 160 may span from one of the first side 146 and the second side 148 to a midway point between the first side 146 and the second side 148. In other embodiments, the channels 160 may extend along the circumferential direction C other suitable distances. As will be explained further below, air may flow into the channels 160 to cool the spline seal 140 and to meter the leakage flow bypassing the spline seal 140.

The channels 160 may be formed or machined into the spline seal 140 in a number of suitable manners. As one example, the channels 160 may be formed into the spline seal 140. For instance, the channels 160 may be stamped or pressed into the spline seal 140. In the depicted embodiment of FIGS. 4 and 5, the channels 160 were stamped into the spline seal 140. As another example, the channels 160 may be machined into the spline seal 140. For instance, the channels 160 may be machined into the spline seal 140 by an electrical discharge machining (EDM) process. Moreover, the channels 160 may be coined, etched, laser machined, etc. As yet another example, the spline seal 140 may be additively manufactured. Accordingly, the spline seal 140 may be printed in such a way that the channels 160 are formed, e.g., along the first, second, or both surfaces 142, 144 of the spline seal 140.

The channels 160 may have any suitable cross section when viewed from the circumferential direction C. For instance, in FIGS. 4 and 5, the channels 160 have a trapezoidal shape cross section when viewed from the circumferential direction C. In other exemplary embodiments, as shown in FIG. 6, the channels 160 may have a rectangular shape cross section when viewed from the circumferential direction C. In yet other embodiments, as shown in FIG. 7, the channels 160 may have a rounded rectangular shape cross section when viewed from the circumferential direction C, or a rectangular shape with radiused fillets. That is, the channels 160 may have an arch shaped cross section when viewed from the circumferential direction C. Other suitable cross sections are possible.

In some embodiments, the spline seal 140 may define channels along both the first surface 142 and the second surface 144. As shown in FIG. 8, for this embodiment, the body 141 of the spline seal 140 defines a plurality of first channels 162 along the first surface 142 and a plurality of second channels 164 along the second surface 144 of the spline seal 140. By defining first channels 162 along the first surface 142 and the plurality of second channels 164 along the second surface 144, the surface area of the spline seal 140 that is exposed to an airflow is increased thus providing advantageous cooling of the spline seal 140. Moreover, as channels are defined along the first and second surfaces 142, 144, an operator may orient the spline seal 140 within the first groove 132 with the first surface 142 contacting an inner wall 136 of the first groove 132 or with the second surface 144 contacting the inner wall 136 and still have channels defined such that an airflow may pass through the channels and cool the underside or inner surface of the spline seal 140. Stated differently, regardless of the orientation of the spline seal 140, the spline will have channels configured for cooling the underside or hot side of the seal. In some alternative embodiments, the body 141 of the spline seal 140 defines one or more first channels 162 along the first surface 142 and one or more second channels 164 along the second surface 144 of the spline seal 140.

Further, for the depicted embodiment of FIG. 8, the plurality of second channels 164 are spaced from one another along the axial direction A and are offset from the plurality of first channels 162 along the axial direction A. That is, the second channels 164 do not directly oppose the first channels 162 along the axial direction A. Moreover, for this embodiment, the second channels 164 are defined along the second surface 144 midway between adjacent first channels 162 along the axial direction A. Consequently, the first channels 162 are defined along the first surface 142 midway between adjacent second channels 164 along the axial direction A. However, in some embodiments, the second channels 164 need not be defined midway between adjacent first channels 162 along the axial direction A. For instance, the second channels 164 may be defined between adjacent first channels 162 along the axial direction A. That is, the second channels 164 may be defined between adjacent first channels 162 along the axial direction A such that the second channels 164 do not overlap the first channels 162 along the axial direction A.

FIG. 9 provides a top view of one exemplary spline seal 140 according to one exemplary embodiment of the present disclosure. As shown, the spline seal 140 defines a plurality of channels 160 (shown in phantom in FIG. 9). Notably, for this exemplary embodiment, the channels 160 extend between the first side 146 and the second side 148 of the body 141 along the circumferential direction C in a straight manner. That is, the channels 160 extend substantially parallel with the circumferential direction C along the entire circumferential length of the spline seal 140. However, as noted below, in some exemplary embodiments, the channels 160 do not extend in a straight manner; rather, the channels 160 may extend in a non-straight manner.

FIG. 10 provides a top view of one exemplary spline seal 140 according to one exemplary embodiment of the present disclosure. As shown, the body 141 of the spline seal 140 defines a plurality of channels 160 (shown in phantom in FIG. 10). For this embodiment, the channels 160 extend between the first side 146 and the second side 148 along the circumferential direction C in a non-straight manner. Particularly, the channels 160 defined by the spline seal 140 at the first surface 142 (FIGS. 4 and 4) extend between the first side 146 and the second side 148 along the circumferential direction C in a curved manner. In the depicted embodiment of FIG. 10, the channels 160 are curved with respect to the radial direction R as they extend along the circumferential direction C. Although the channels 160 are curved in FIG. 10, in other exemplary embodiments, the channels 160 may extend between the first side 146 and the second side 148 in other non-straight manners. For instance, in some exemplary embodiments, the channels 160 may zigzag as they extend along the circumferential direction C. In yet other embodiments, the sidewalls of one or more channels 160 may extend parallel to one another but at an angle relative to the circumferential direction as the one or more channels 160 extend along the circumferential direction C. In embodiments where the channels 160 extend along the circumferential direction C in a non-straight manner, the surface area of the spline seal 140 that is exposed to an airflow during operation of a turbomachine is increased thus providing advantageous cooling of the spline seal 140.

Figure 11:
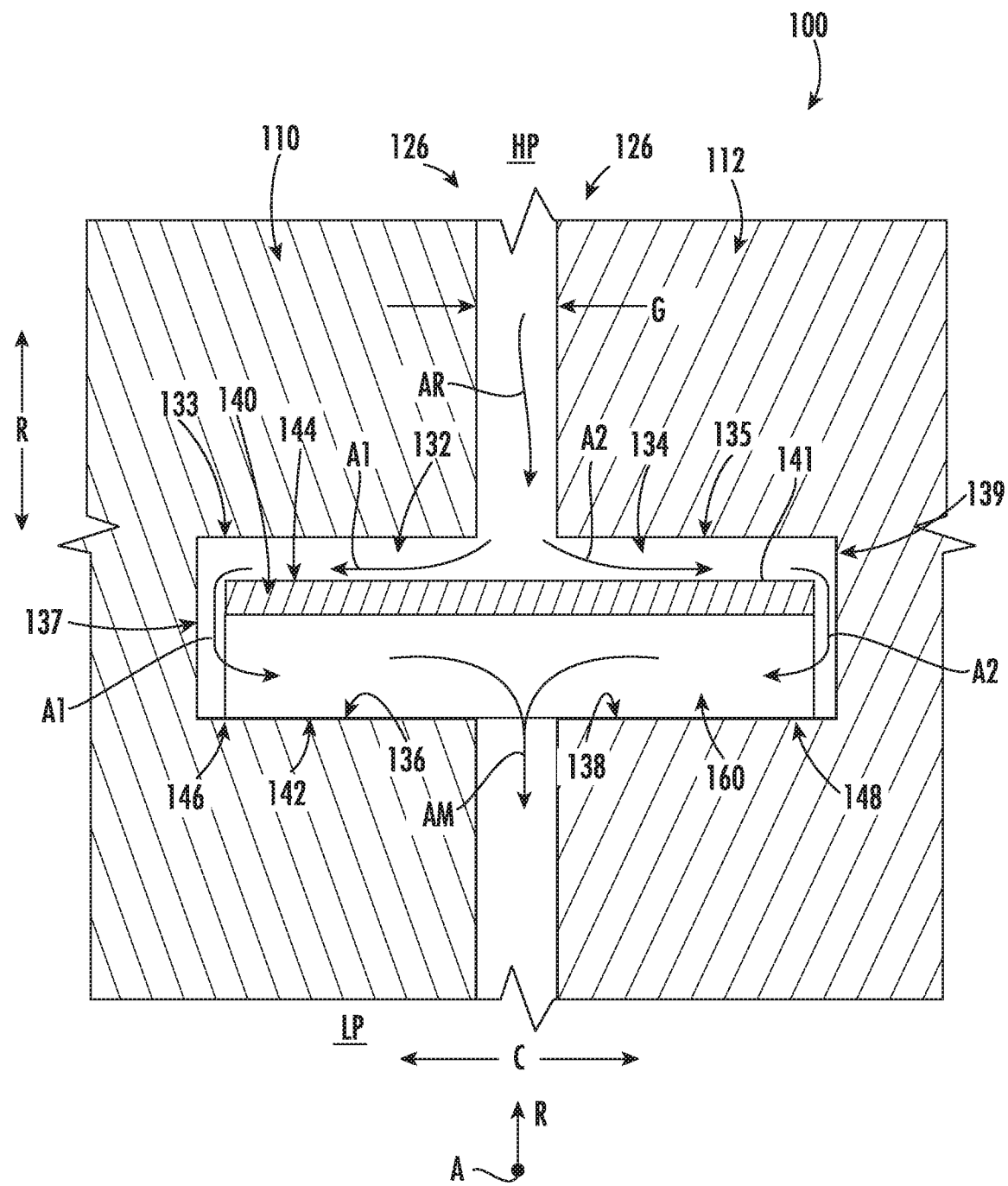
FIG. 11 provides a schematic, axial cross sectional view of the spline seal positioned between the first flowpath segment and a second flowpath segment of the segmented flowpath assembly of FIG. 3.

FIG. 11 provides a schematic, axial cross sectional view of the spline seal 140 positioned between the first flowpath segment 110 and the second flowpath segment 112. An exemplary manner in which the spline seal 140 may be cooled will be described. For this embodiment, the segmented flowpath assembly 100 is situated in a turbomachine such that a high pressure region HP of air is positioned radially outward of the flowpath segments 110, 112 and a low pressure region LP is positioned radially inward of the flowpath segments 110, 112. For instance, the lower pressure region LP may be the hot gas path 78 (FIG. 2) of turbofan 10 (FIG. 1). In such embodiments, during operation of the turbomachine, e.g., a turbine engine, the first surface 142 of the spline seal 140 is seated or positioned on an inner wall 136 of the first groove 132 of the first flowpath segment 110 and an inner wall 138 of the second groove 134 of the second flowpath segment 112 as shown in FIG. 11.

During operation, air AR from the high pressure region HP flows radially inward through the gap G defined between the first flowpath segment 110 and the second flowpath segment 112. The air AR, blocked by the spline seal 140, transitions from the radial direction R to the circumferential direction C (and axial direction A, not shown in the FIG. 11). Particularly, a first portion of air A1 flows into the first groove 132 defined by the first flowpath segment 110 and a second portion of air A2 flows into the second groove 134 defined by the second flowpath segment 112. The first portion of air A1 initially flows along the circumferential direction C away from the gap G between an outer wall 133 that at least partially defines the first groove 132 and the second surface 144 of the spline seal 140. The second portion of air A2 initially flows along the circumferential direction C away from the gap G between an outer wall 135 that at least partially defines the second groove 134 and the second surface 144 of the spline seal 140. The second portion of air A2 flows opposite the first portion of air A1 along the circumferential direction C. When the first portion of air A1 within the first groove 132 reaches a sidewall 137 that at least partially defines the first groove 132, the first portion of air A1 is directed into one of the channels 160 of the spline seal 140 (only one shown in FIG. 11). Similarly, when the second portion of air A2 within the second groove 134 reaches a sidewall 139 that at least partially defines the second groove 134, the second portion of air A2 is directed into one of the channels 160 of the spline seal 140. Once in one of the channels 160, the air flows along the circumferential direction C toward the gap G between the first and second flowpath segments 110, 112. Specifically, the first portion of air A1 within the first groove 132 flows toward the second side 126 (i.e., toward the gap G) of the first flowpath segment 110 and the second portion of air A2 within the second groove 134 flows toward the first side 124 (i.e., toward the gap G) of the second flowpath segment 112 along the circumferential direction C. The two portions of air A1, A2 eventually mix together and with the hot gas from the flowpath within the channel 160 and the mixed air and gas AM continues to flow radially inward and axially aft between the gap G toward the low pressure region LP.

Advantageously, as the air moves about the spline seal 140 and through the channels 160, the air cools the spline seal 140. Particularly, the air flowing through the channels 160 may cool both surfaces of the spline seal 140. The air may first cool the second surface 144 (which is heated mainly through conduction from the first surface 142) and then may cool the first surface 142 that is exposed to high temperature combustion gases. Finally the air mixes with the hot gas from the turbine flowpath that enters the gap G, thereby lowering the temperature of the gas that impinges onto the spline seal downstream of the leaked air. The channels 160 allow for a cooling airflow to cool the spline seal 140 such that the spline seal 140 formed of a high temperature material may be used in turbomachinery that utilizes non-traditional high temperature materials for the flowpath segments, such as e.g., CMC materials. Moreover, the channels 160 may advantageously meter the leakage flow around and about the spline seal 140.

Further, as the channels 160 are formed or machined into the spline seal 140, there is no need to machine or form dedicated cooling features in the flowpath segments. For instance, there is no need to form castellations, slits, or similar cooling features into the end faces of the flowpath segments. In this way, the manufacture of relatively expensive flowpath segments may be reduced and such features may be machined or formed into spline seals, which are as noted previously, relatively inexpensive compared to flowpath segments. Thus, the risk of part nonconformance is shifted from relatively expensive parts (flowpath segments) to relatively inexpensive parts (spline seals). Accordingly, the exemplary spline seal 140 described herein may reduce the overall cost of segmented flowpath assemblies, including machining costs to manufacture flowpath segments. Moreover, local stress risers and the overall radial envelope of the seal slots machined into the flowpath segments may be reduced.

Figure 12:
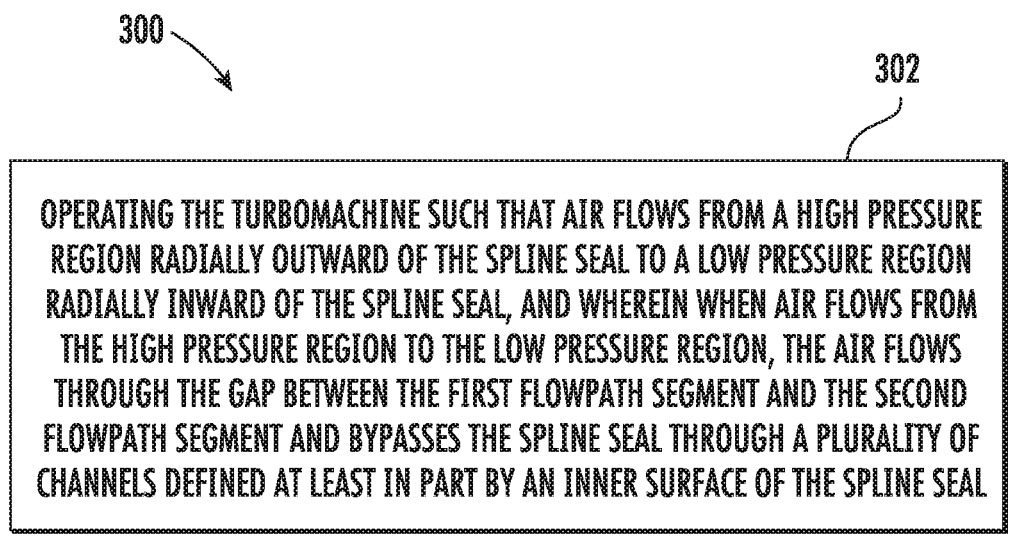
FIG. 12 provides a flow diagram of an exemplary method in accordance with exemplary embodiments of the present disclosure.

FIG. 12 provides a flow diagram of an exemplary method (300) for cooling a spline seal configured for sealing a gap defined between a first flowpath segment and a second flowpath segment of a turbomachine in accordance with exemplary embodiments of the present disclosure. For instance, the exemplary method (300) may be utilized to cool any of the exemplary spline seals 140 described above. The turbomachine may be the turbofan 10 of FIG. 1 and the first and second flowpath segments may be any of the flowpath segments shown in FIG. 2, for example. It should be appreciated that the exemplary method (300) is discussed herein only to describe exemplary aspects of the present subject matter, and is not intended to be limiting.

At (302), the method (300) includes operating the turbomachine such that air flows from a high pressure region radially outward of the spline seal to a low pressure region radially inward of the spline seal, and wherein when air flows from the high pressure region to the low pressure region, the air flows through the gap between the first flowpath segment and the second flowpath segment and bypasses the spline seal through a plurality of channels defined at least in part by an inner surface of the spline seal. For instance, air may flow through the gap between the first flowpath segment and the second flowpath segment and bypass the spline seal in a manner as described above with reference to FIG. 11.

In some implementations, during operating at (302), the inner surface of the spline seal is seated on an inner wall that at least partially defines a first groove in the first flowpath segment and an inner wall that at least partially defines a second groove in the second flowpath segment during operation of the turbomachine. For instance, as shown in FIG. 11, the inner surface, denoted as the first surface 142, is seated on the inner wall 136 that defines the first groove 132 in part and seated on the inner wall 138 that defines the second groove 134 in part. As shown in FIG. 11, even though the spline seal 140 is seated on the inner walls 136, 138, air is able to cool the underside, which may be relatively hot, via passage of the air through or within the channels 160. Further, in some implementations of method (300), the spline seal extends circumferentially between a first side and a second side and radially between the inner surface and an outer surface, and wherein the plurality of channels extend along the inner surface between the first side and the second side. Thus, the spline seal 140 may be cooled along its circumferential length as shown in FIG. 11.

In some implementations of method (300), the first groove is defined by an inner wall, an outer wall spaced radially from the inner wall, and a sidewall extending between and connecting the inner wall and the outer wall, and wherein the second groove is defined by an inner wall, an outer wall spaced radially from the inner wall of the second groove, and a sidewall extending between and connecting the inner wall and the outer wall of the second groove, and wherein during operation of the turbomachine, a first portion of air flows between the outer wall of the first groove and the outer surface of the spline seal and into one of the plurality of channels at the first side of the spline seal and a second portion of air flows between the outer wall of the second groove and the outer surface of the spline seal and into one of the plurality of channels at the second side of the spline seal. For instance, air may flow through the gap between the first flowpath segment and the second flowpath segment and split between the first portion of air and the second portion of air to bypass the spline seal in a manner as described above with reference to FIG. 11.

In some exemplary embodiments and implementations described herein, the flowpath segments of the segmented flowpath assembly and spline seal therefore may have other orientations. For instance, in some exemplary embodiments, the segment flowpath assembly includes a first flowpath segment and a second flowpath segment positioned adjacent the first flowpath segment. The first flowpath segment is positioned axially forward of the second flowpath segment. The first and second flowpath segments may be annular rings, for example. The first flowpath segment defines a first groove and the second flowpath segment defines a second groove oppositely facing the first groove of the first flowpath segment. The first and second grooves may be defined to receive an axially extending spline seal. In such embodiments, the one or more channels defined by spline seal extend axially, e.g., between the first end and the second end of the spline seal. Further, in some exemplary embodiments and implementations described herein, the spline seal may be radially oriented and may define one more channels that extend axially, circumferentially, or radially.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A segmented flowpath assembly for a turbomachine, the segmented flowpath assembly comprising:
   a first flowpath segment defining a first groove;

a second flowpath segment positioned adjacent the first flowpath segment and defining a second groove oppositely facing the first groove of the first flowpath segment; and a spline seal positioned at least partially within the first groove of the first flowpath segment and at least partially within the second groove of the second flowpath segment, the spline seal having a body extending between a first surface and a second surface opposing the first surface, wherein the body of the spline seal defines a plurality of channels directly disposed on the first surface to allow airflow therethrough, wherein the first surface is radially inward from the second surface, and wherein air flows from a position radially outward from the first and second flowpath segments to a position radially inward from the first and second flowpath segments.

2. The segmented flowpath assembly of claim 1, wherein the segmented flowpath assembly defines a radial direction, and wherein the body of the spline seal extends between the first surface and the second surface opposing the first surface along the radial direction, and wherein the first surface is an inner surface and the second surface is an outer surface of the body.

3. The segmented flowpath assembly of claim 1, wherein the segmented flowpath assembly defines a circumferential direction, and wherein the body of the spline seal extends between a first side and a second side along the circumferential direction, and wherein the first side is positioned at least partially within the first groove of the first flowpath segment and the second side is positioned at least partially within the second groove of the second flowpath segment, and wherein the plurality of channels extend from the first side to the second side of the body.

4. The segmented flowpath assembly of claim 3, wherein one or more of the plurality of channels extend between the first side and the second side along the circumferential direction in substantially a straight manner.

5. The segmented flowpath assembly of claim 3, wherein one or more of the plurality of channels extend between the first side and the second side along the circumferential direction in a non-straight manner.

6. The segmented flowpath assembly of claim 1, wherein the segmented flowpath assembly defines an axial direction, and wherein the body of the spline seal extends between a first end and a second end along the axial direction, and wherein the plurality of channels are spaced from one another along the axial direction at predetermined intervals between the first end and the second end.

7. The segmented flowpath assembly of claim 1, wherein the plurality of channels defined along the first surface of the body are a plurality of first channels, and wherein the body of the spline seal defines a plurality of second channels along the second surface.

8. The segmented flowpath assembly of claim 7, wherein the segmented flowpath assembly defines an axial direction, and wherein the plurality of second channels are spaced from one another along the axial direction and are offset from the plurality of first channels along the axial direction.

9. The segmented flowpath assembly of claim 1, wherein a gap is defined between the first flowpath segment and the second flowpath segment, and wherein the first surface of the spline seal is seated on an inner wall of the first groove of the first flowpath segment and an inner wall of the second groove of the second flowpath segment during operation of the turbomachine.

10. The segmented flowpath assembly of claim 1, wherein the spline seal is formed of a high temperature material.

11. The segmented flowpath assembly of claim 1, wherein the first flowpath segment is a first shroud segment and the second flowpath segment is a second shroud segment.

12. A method for cooling a spline seal configured for sealing a gap defined between a first flowpath segment and a second flowpath segment of a segmented flowpath assembly for a turbomachine, the method comprising:

operating the turbomachine such that air flows from a high pressure region radially outward of the spline seal to a low pressure region radially inward of the spline seal, and wherein when air flows from the high pressure region to the low pressure region, the air flows through the gap between the first flowpath segment and the second flowpath segment and bypasses the spline seal through a plurality of channels defined at least in part by an inner surface of the spline seal.

13. The method of claim 12, wherein during operating, the inner surface of the spline seal is seated on an inner wall that at least partially defines a first groove in the first flowpath segment and an inner wall that at least partially defines a second groove in the second flowpath segment during operation of the turbomachine.

14. The method of claim 13, wherein the spline seal extends circumferentially between a first side and a second side and radially between the inner surface and an outer surface, and wherein the plurality of channels extend along the inner surface between the first side and the second side.

15. The method of claim 14, wherein the first groove is defined by an inner wall, an outer wall spaced radially from the inner wall, and a sidewall extending between and connecting the inner wall and the outer wall, and wherein the second groove is defined by an inner wall, an outer wall spaced radially from the inner wall of the second groove, and a sidewall extending between and connecting the inner wall and the outer wall of the second groove, and wherein during operation of the turbomachine, a first portion of air flows between the outer wall of the first groove and the outer surface of the spline seal and into one of the plurality of channels at the first side of the spline seal and a second portion of air flows between the outer wall of the second groove and the outer surface of the spline seal and into one of the plurality of channels at the second side of the spline seal.

16. A spline seal for sealing a gap between adjacent flowpath segments of a turbomachine, the spline seal comprising:

a body extending between a first surface and a second surface spaced from the first surface, wherein the body of the spline seal defines one or more channels directly disposed on the first surface, wherein the adjacent flowpath segments comprise:

a first flowpath segment comprising a first groove having a first circumferential surface and a second circumferential surface radially outward from the first circumferential surface; and a second flowpath segment comprising a second groove having a first circumferential surface and a second circumferential surface radially outward from the first circumferential surface, and wherein the first surface of the body of the spline seal contacts the first circumferential surface of the first flowpath segment and the first circumferential surface of the second flowpath segment.

17. The spline seal of claim 16, wherein the body extends between a first side and a second side spaced from the first side, the first side and the second side extending between and connecting the first surface and the second surface, and wherein the one or more channels extend between the first side and the second side.

18. The spline seal of claim 17, wherein the first side is positioned within the first groove and the second side is positioned with the second groove.

19. The spline seal of claim 16, wherein the spline seal is formed of a high temperature material.

20. The spline seal of claim 16, wherein the body of the spline seal defines one or more second channels along the second surface, and wherein the one or more second channels are offset from the one or more channels.

* * * * *